United States Patent [19]
Miller et al.

[11] 3,916,674
[45] Nov. 4, 1975

[54] OIL-SPILL DETECTION SYSTEM

[75] Inventors: Gordon H. Miller, Richmond; Edward O. Renick, Jr., Sandston, both of Va.

[73] Assignee: Texaco Inc., New York, N.Y.

[22] Filed: Feb. 22, 1974

[21] Appl. No.: 444,934

[52] U.S. Cl. ............. 73/61.1 R; 324/65 R; 340/236
[51] Int. Cl.² ........................................ G01N 27/22
[58] Field of Search ............... 73/61.1 R, 53, 421 B; 210/85, 400, 402; 324/61 R, 65 R; 340/236

[56] References Cited
UNITED STATES PATENTS

| | | |
|---|---|---|
| 3,617,552 | 11/1971 | Will et al. ......................... 210/400 X |
| 3,709,369 | 1/1973 | Brill et al. ............................ 210/400 |
| 3,774,185 | 11/1973 | Parth ............................ 73/61.1 R X |
| 3,800,219 | 3/1974 | Fosberg ........................... 340/236 X |

FOREIGN PATENTS OR APPLICATIONS 1,399,477  4/1965  France ................................ 340/236

*Primary Examiner*—Richard C. Queisser
*Assistant Examiner*—Joseph W. Roskos
*Attorney, Agent, or Firm*—T. H. Whaley; C. G. Ries; Henry C. Dearborn

[57] ABSTRACT

An oil-spill detection instrument which employs a rotating disc that is partially submerged in the body of water to be monitored. There is a doctor blade for removing adhering liquids from the surface of the disc, which liquids are accumulated in a settling vessel. Overflow is directed to apparatus for detecting the presence of oil. The sensitivity of the instrument is good without being too delicate.

8 Claims, 7 Drawing Figures

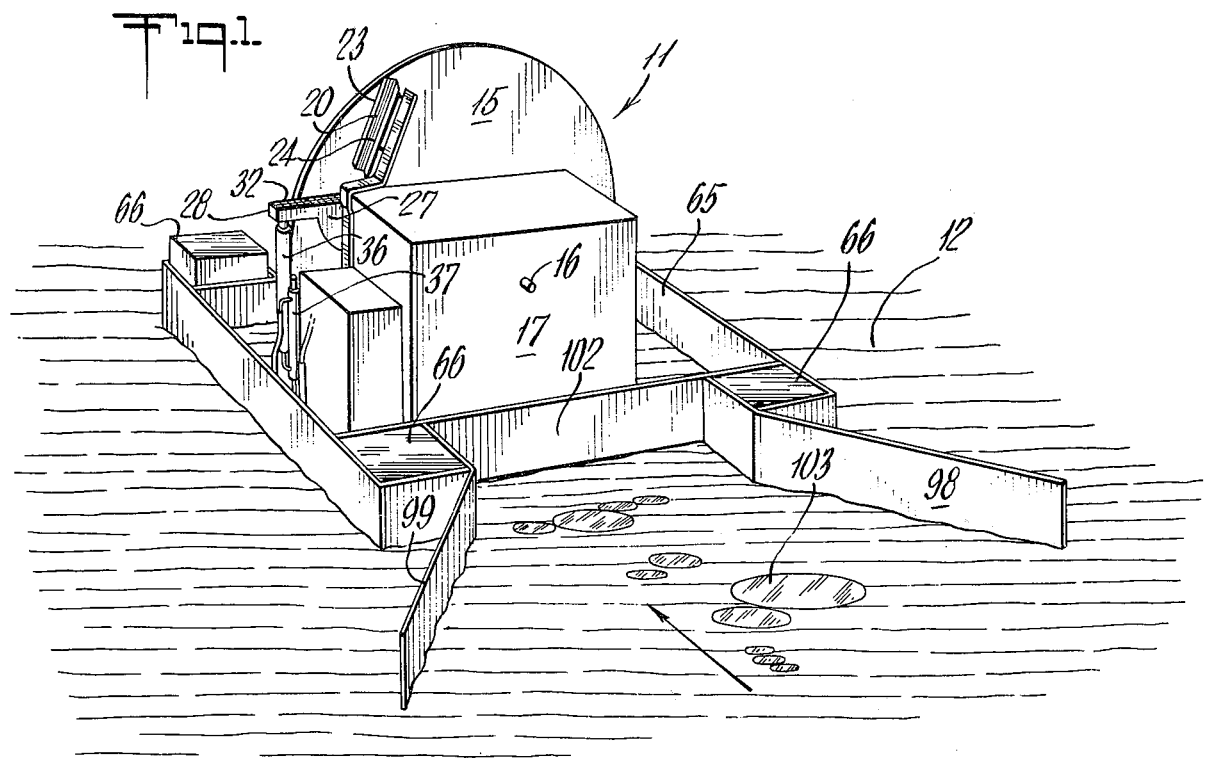
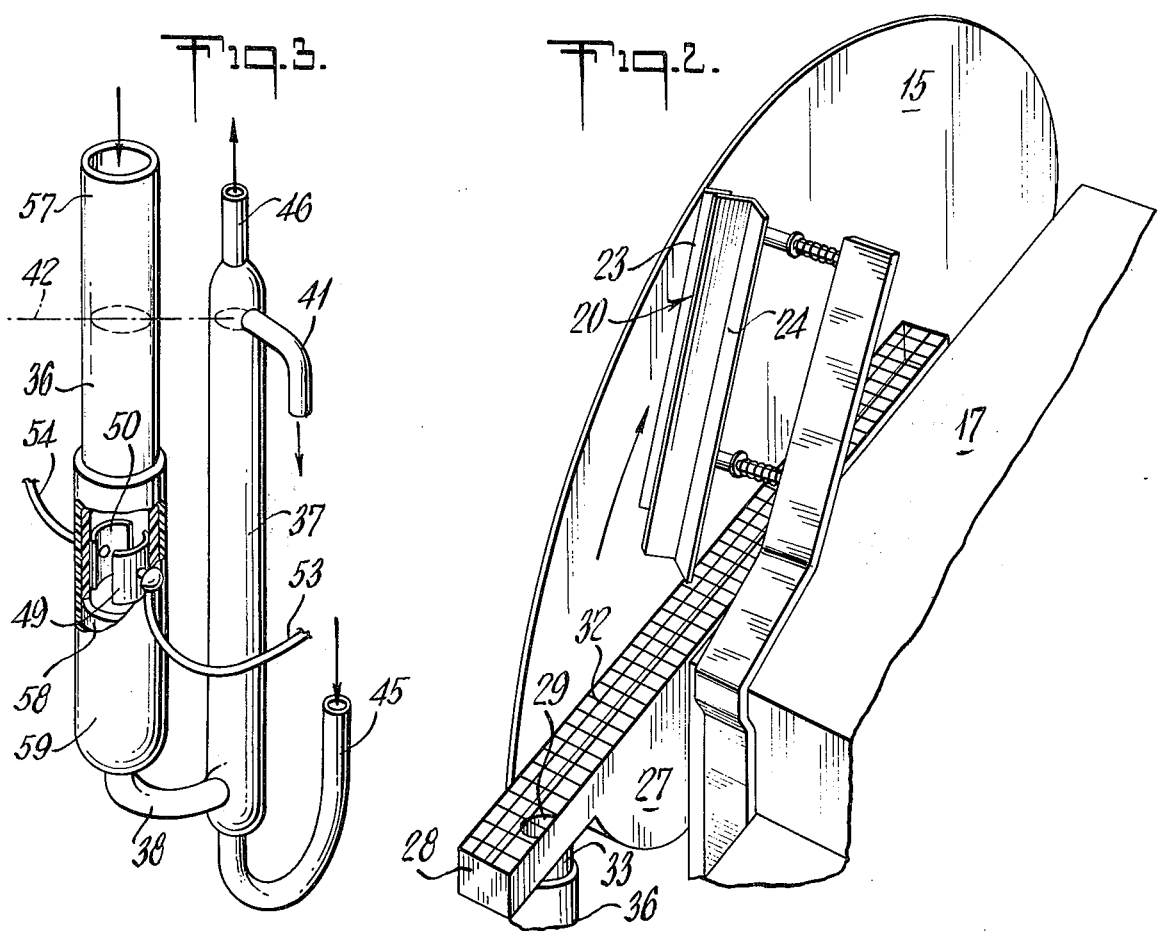

OIL-SPILL DETECTION SYSTEM

BACKGROUND OF THE INVENTION

1. Field of the Invention

This invention concerns a system for use in the detection of oil spills on a body of water. More specifically, it deals with a system that includes means for picking up oil and water from the surface of the water and then measuring an oil-related property of the accumulation, in order to determine whether oil is present on the water.

2. Description of the Prior Art

Heretofore, various proposals have been made for removing oil spills from the surface of bodies of water, and also various instruments are known which may detect the presence of oil in a liquid; but there has not been any known combination like this invention that can reliably make a continuous measurement in such manner as to positively indicate the presence of oil on the surface of a body of water without undue sensitivity.

Consequently, it is an object of this invention to provide a highly reliable system that is not overly sensitive, but that will continuously monitor the conditions of the surface of a body of water so as to indicate the presence of oil whenever it appears.

SUMMARY OF THE INVENTION

Briefly, the invention concerns a system for detecting oil spills on a body of water. It comprises, in combination, a rotatable disc and means for supporting said disc partially submerged in said body of water. It also comprises means for rotating said disc about its axis in order to lift oil from the surface of said body of water by adherence to the surface of said disc, and it comprises scraper means cooperating with the surface of the disc above said body of water for removing any adherents, including said oil. The system also comprises means for detecting the presence of oil in said removed adherents.

Again, briefly, the invention concerns a system for detecting oil spills on a body of water which comprises, in combination, a stainless-steel rotatable disc, and buoyant means for supporting said disc partially submerged in said body of water while it is floating on the surface thereof. The system also comprises surface-water flow-directing wings attached to said buoyant means for directing movement of surface water to the vicinity of said disc, and means for rotating said disc about its axis for continuously submerging the periphery thereof. The system also comprises a doctor blade bearing against said periphery above the surface of said body of water for removing liquid adherents including any oil floating on said water surface, and channel means associated with said blade for directing said adherents into a sediment settling vessel having an outlet therefrom. The said outlet directs said adherents into an upstanding tubular container having electrically insulating interior walls. The system also comprises a pair of electrically conducting plates mounted diametrically opposite one another and forming a capacitor with said adherents filling the space therebetween, and it comprises a turbulence chamber connected to the bottom of said tubular container and having an overflow outlet for maintaining the level of said adherents above said capacitor plates. The system also comprises air-bubble inlets and outlets on said turbulence chamber for passing bubbles therethrough to prevent settling of fine solids, and electrical bridge circuit means including an indicator for indicating the presence of oil in said adherents by measuring the change in capacitance in said capacitor.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein FIG. 1 is a schematic in perspective, showing an entire system according to the invention;

FIG. 2 is an enlarged fragmentary perspective showing a portion of the disc with the location of the doctor blade;

FIG. 3 is an enlarged perspective showing the tubular container with a capacitor, and also the turbulence chamber connected thereto;

DESCRIPTION OF THE PREFERRED EMBODIMENT

Figure 7:
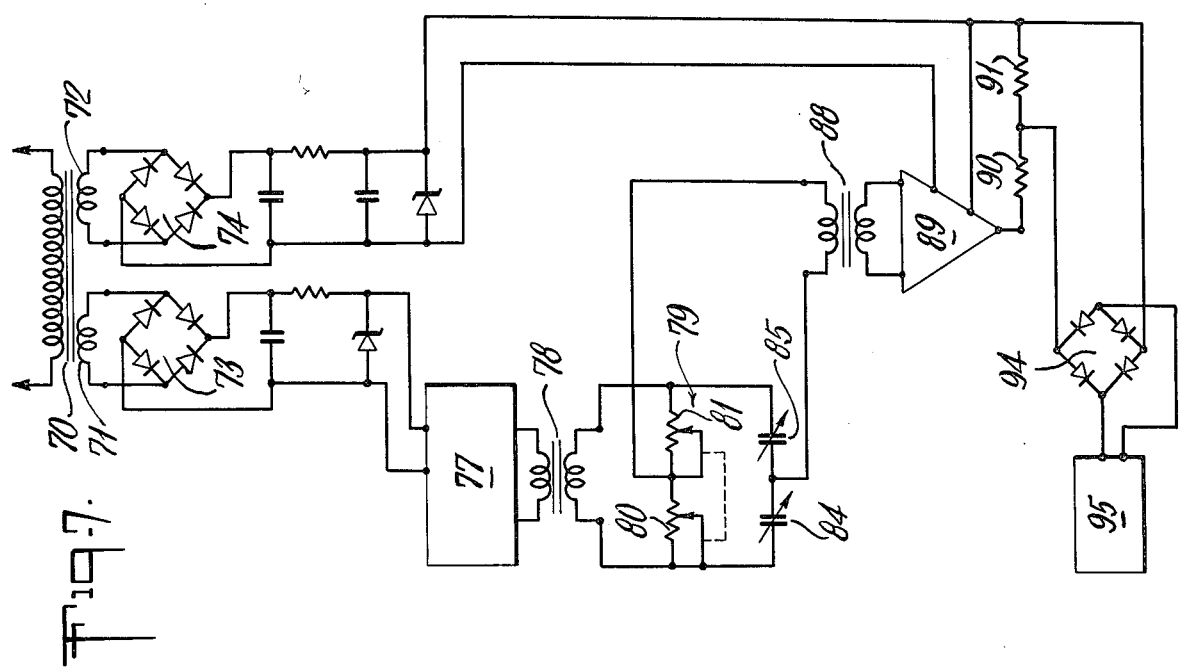
FIG. 7 is a schematic circuit diagram illustrating the electrical system that is employed in measuring the capacitance of the capacitor, which determines the presence of oil.
Figure 6:
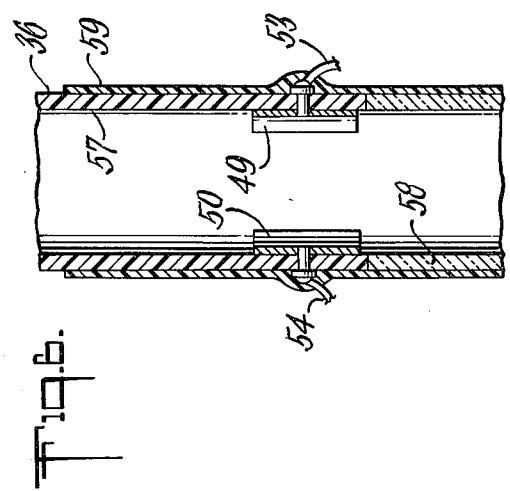
FIG. 6 is an extra-enlarged fragmentary longitudinal cross-section of the tubular container, illustrating the capacitor plates.

Referring to FIG. 1, it will be observed that the illustrated embodiment provides for an instrument 11 which is designed to float on the surface of a body of water 12. The instrument includes a disc 15 which is mounted for rotation about its axis. The axis is located at the center of a supporting shaft 16 to which it is attached in a fixed manner for rotation therewith at all times. The shaft 16 is driven in rotation by a motor 17.

The disc may be constructed of different materials. However, such materials should preferably be one of those which has at least partial affinity for oil. Thus, the disc 15 might be metallic, and if desired, could be coated with any appropriate plastic material such as that known by the trade name Teflon. However, it has been found that a stainless-steel disc operates very satisfactorily by providing sufficient adherence of any oil floating on the surface of the body of water 12.

Figure 4:
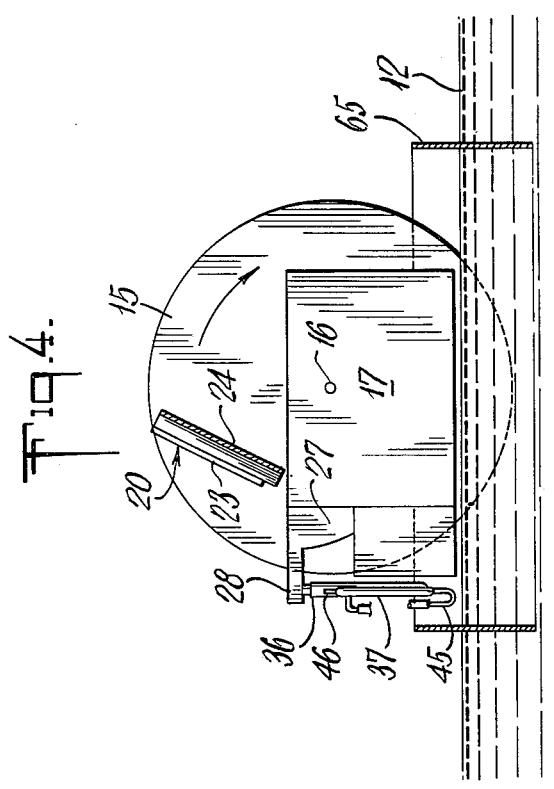
FIG. 4 is an elevation partly in cross-section, showing the system illustrated in FIG. 1.
Figure 5:
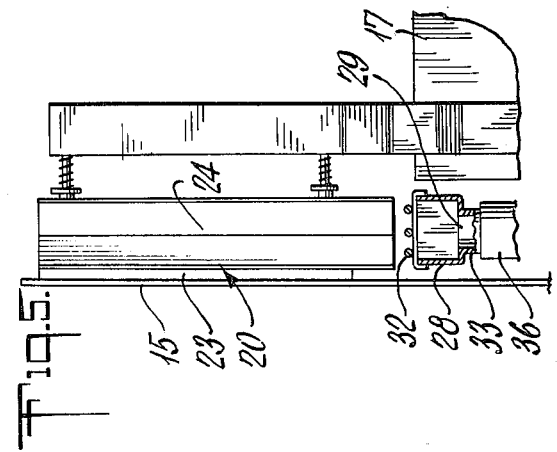
FIG. 5 is an enlarged fragmentary side view showing the disc and doctor blade with related cooperative elements of the system.

It will be noted that the disc 15 is rotated clockwise, as viewed in FIGS. 1, 2, and 4. Consequently, as it rotates, the outer periphery sector which is submerged in the body of water 12, will move into a contact line formed by a doctor blade 20. The doctor blade acts to scrape off and thus remove a substantial portion of the adherents on the surface of the disc 15 over an area formed by contacts with the doctor blade 20. Such adherents will include any oil which may have been on the surface of the body of water 12 where it came into contact with the face of the disc 15 as it was rotated from beneath the surface out of the water. These liquids will then run down by gravity flow over a flexible edge 23 which is part of the blade 20. They will continue down inside of a channel member 24 to drop off and fall into a vessel 27. Vessel 27 has an arcuate shape to provide a deep bottom portion where any sediment that is included with the adherent liquids, may settle out. The top of the vessel 27 is open but covered by a screen 32. There is a radially extending portion 28 of the vessel 27 that has a port 29 in the bottom near the extremity thereof. The adherent liquids may flow through port 29, and it will be observed that this acts as an overflow from the contents of the vessel 27.

The adherent liquids which are being removed from the surface of the disc 15, after flowing over and off the doctor blade 20 (with its flexible edge 23) and along the channel 24, will have dropped into the vessel 27 through the screen 32. After the vessel 27 has been filled to the level of the extension 28, these liquids will flow outward along the extension 28 and through the port 29 to a connecting conduit 33 that directs them into the top of a tubular container 36.

As most clearly shown in FIG. 3, the level of the liquids in container 36 is maintained at a desired height above the capacitor, to be described below. This is accomplished by having the vertical location of an adjacent turbulence chamber 37 set for determining the level of overflow from it. Chamber 37 is connected to the bottom of the container 36 via a tube 38. This tube 38 (see FIG. 3) is connected into the chamber 37 near the bottom so as to act as a U-tube in conjunction with the container 36. By this arrangement the chamber 37 will maintain the level in the container 36 at the vertical position of an outlet tube 41 which connects into the chamber 37 at a liquid level 42, indicated by a dashed line in FIG. 3.

The purpose of the chamber 37 is to provide turbulence in the liquids flowing through the system so that fine solids will not clog the fluid flow. Such turbulence is obtained by having an air-bubble inlet tube 45 connected to the bottom of the chamber 37. Then, sufficient air pressure is applied to cause bubbles to rise through the chamber 37. There is, of course, an outlet 46 at the top of the chamber 37 for permitting escape of the air which has bubbled through the liquid.

At an appropriate vertical distance beneath the level 42 in the tubular container 36, there is a pair of conductive-material plates or electrodes 49 and 50, which are situated diametrically opposite each other. These form an electrical capacitor the dielectric of which is made up of the fluid flowing through the container 36. The plates 49 and 50 each have electrical circuit connectors, as indicated by wires 53 and 54, respectively, in order to be able to make electrical connection of the capacitor into an appropriate circuit.

It will be understood that various structural arrangements of tubular container 36 might be made. However, preferably it is made up of an electrically insulating material upper portion 57. Such tube 57 has mounted near the bottom thereof the capacitor plates 49 and 50. The lower portion of the container 36 is a glass tube 58 that, along with the lower end of the tube 57, is encased by a surrounding outer portion 59.

The framework which makes up a supporting structure for the entire system might take various forms. As illustrated, it includes an outer rectangular frame 65 which has at each of the four corners an arrangement to support floatation members 66. These are constructed of appropriate material having adequate buoyancy to create floatation for the entire device. It will be appreciated that the floatation effects may be adjusted by vertically positioning these members 66 in the rectangular frames which surround them. This would be done in order to cause the entire framework 65 and the rest of the system to float in a level position.

FIG. 7 shows a circuit diagram for the electrical elements that may be employed. This includes a transformer 70 that will be connected to a conventional power source (not shown). The transformer has two secondary windings 71 and 72 in order to supply power for two different DC voltage supplies. These DC supplies are taken off at the outputs of corresponding diode bridges 73 and 74. The bridge 73 has its output connected to supply DC power to an oscillator 77. Oscillator 77 feeds an AC supply via a transformer 78 to a bridge network 79. This bridge network includes a pair of resistors 80 and 81 as well as variable capacitors 84 and 85, as illustrated.

It will be understood that one of these capacitors 84 or 85 is the capacitor described above that is mounted in the tubular container 36 and has capacitor plates 49 and 50. Its capacitance will vary in accordance with the properties of the liquid forming a dielectric which properties, in turn, will vary in accordance with the amount of oil that is included.

The output of the bridge 79 goes via another transformer 88 to the input of an amplifier 89. There is a voltage divider in the output of amplifier 89 which is formed by a pair of resistors 90 and 91 so that the amplitude of the bridge output is reduced by being taken only across the resistor 91. Thus, whenever the bridge 79 is unbalanced, there will be a signal developed at the output of the amplifier 89, and a desired portion of this will be taken from across resistor 91 to be applied to the input of a diode rectifier bridge 94 so as to feed from its output a DC signal to an appropriate meter 95.

It may be noted that the output of the diode bridge 74 goes to provide a DC power source to the amplifier 89.

It will be appreciated that by balancing the electrical bridge 79 under conditions when no oil has been picked up from the body of water, the meter 95 will then read zero. Thereafter, when oil is packed up and flows into the tubular container 36 and between the plates 49 and 50 of the capacitor, it will change the capacitance of this capacitor (84 or 85) and so unbalance the bridge 79 and cause an output signal which will be indicated by the meter 95.

OPERATION

It will be understood that a monitoring instrument according to the invention would be anchored or otherwise tethered at a desired location on a body or water to be monitored for oil spills. The motor 17 would be energized and, consequently, the disc 15 would be rotated in the direction indicated by the arrows in FIGS. 1 and 2. As the submerged portion of the disc rises out of the water, it carries surface water and any oil or the like which clings to the surface of the disc, up until they contact the doctor blade 20 with its flexible edge 23. This removes such adherents, and they run down the channel 24 to fall onto the screen 32 and through, into the vessel 27.

As soon as the vessel 27 is full, the overflow goes out into the radial extension 28 and then through the port 29 into the tubular container 36. Here the container fills up until the overflow level is reached, as determined by the vertical level of the tube 41 of the turbulence chamber 37.

When these conditions are reached, the electrical bridge 79 would be balanced by adjusting whichever of the capacitors 84 or 85 is not that having the plates 49 and 50. The balance would be indicated by a zero or minimum reading at the meter 95. This would represent the absence of oil on the body of water being monitored.

Thereafter, whenever any oil is encountered, it would be picked up and end up in the container 36 between the plates 49 and 50, so that the capacitance would change and the bridge 79 would be unbalanced. Such unbalance would produce a signal which would be indicated by the meter 95, and an alarm or control signal would also be developed, if desired.

It will be understood that the system according to this invention has the ability to be adjusted for desired sensitivity so that inconsequential oil presence on the surface of the body of water need not be indicated. Also, the system may be continuously operated, with appropriate monitoring, so that whenever an oil spill occurs, it will be indicated, and appropriate action may be taken.

It should be noted that there is a tendency under calm conditions for surface flow of the water 12 to be diverted around the instrument and so to create a diversion of any oil floating on the surface around the framework of the instrument. In order to avoid such condition, the illustrated structure includes a pair of wings 98 and 99 that are attached to the framework 65 in an appropriate manner. These are situated so as to create a wide mouth into which surface flow will take place.

Some movement of surface liquid will tend to be created by the action of picking up of adherents onto the surface of the disc 15 with removal thereof by the doctor blade 20. However, under some circumstances it might be found necessary to add some pumping (not shown) of fluid from the vicinity of the disc 15 within the framework 65 to a point downstream in order to insure that surface liquid will be drawn into the instrument.

It is to be understood that the frame 65 includes a cross brace 102 which is narrower than the sides of the frame 65, so that it (brace 102) clears the surface of the water 12 in order to permit any floating oil 103 to go into the inside and then come in contact with the disc 15.

It will be appreciated that other arrangements for detecting the presence of oil in the surface adherents might be employed. For example, the oil could be sensed by the use of infrared, refractive index, or hot wire combustion in addition to the capacitance method disclosed above. However, the capacitance method has been found to be very reliable and trouble-free and so is preferred.

It will be understood that the wings 98 and 99 may need some extra buoyancy to hold the frame 65 level. This would be easily supplied by attaching appropriate floats (not shown) near the extremities of the wings.

While a particular embodiment of the invention has been described above in considerable detail and in accordance with the applicable statutes, that is not to be taken as in any way limiting the invention, but merely as being descriptive thereof.

We claim:

1. System for detecting oil spills on a body of water, comprising in combination
   a rotatable thin disc,
   means for rotating said thin disc about its axis in order to lift oil from the surface of said body of water by adherence to the flat surface of said disc,
   buoyant means for supporting said disc partially submerged in said body of water and having the flat face of the disc transverse to the direction of movement of surface liquid,
   scraper means cooperating with said flat surface of said disc above said body of water for removing adherents including said oil,
   means for detecting the presence of oil in said removed adherents, and
   divergent means for directing movement of surface water of said body to the location of said disc.

2. A system according to claim 1, also comprising
   means associated with said scraper means for directing said adherents to a container therefore,
   said container being associated with said detecting means.

3. A system according to claim 2, wherein
   said disc is metallic.

4. A system according to claim 3, wherein
   said detecting means is capacitive,
   said container is columnar, and
   said detecting means comprises a pair of capacitor electrodes on said container column for having said adherents act as the electrolyte therebetween.

5. A system according to claim 4, wherein
   said adherents-directing means comprises means for receiving and settling out sediment from said adherents.

6. A system according to claim 5, also comprising
   means for maintaining the level of said adherents above said capacitor electrodes.

7. A system according to claim 6, wherein
   said disc is stainless steel.

8. System for detecting oil spills on a body of water, comprising in combination
   a stainless-steel rotatable disc,
   buoyant means for supporting said disc partially submerged in said body of water while floating on the surface thereof,
   surface-water flow-directing wings attached to said buoyant means for directing movement of surface water to the vicinity of said disc,
   means for rotating said disc about its axis for continuously submerging the periphery thereof,
   a doctor blade bearing against said periphery above the surface of said body of water for removing liquid adherents including any oil floating on said water surface,
   channel means associated with said blade for directing said adherents into a sediment settling vessel having an outlet therefrom,
   said outlet directing said adherents into an upstanding tubular container having electrically insulating interior walls,
   a pair of electrically conducting plates mounted diametrically opposite one another and forming a capacitor with said adherents filling the space therebetween,
   a turbulence chamber connected to the bottom of said tubular container and having an overflow outlet for maintaining the level of said adherents above said capacitor plates,
   air-bubble inlet and outlets on said tubulence chamber for passing bubbles through to prevent settling of fine solids, and electrical bridge circuit means including an indicator for indicating the presence of oil in said adherents by measuring the change in capacitance of said capacitor.

* * * * *